United States Patent [19]

Bates et al.

[11] 4,290,122

[45] Sep. 15, 1981

[54] SELF-SYNCHRONIZING CLOCK SOURCE FOR OPTICAL MEMORIES

[75] Inventors: Roger D. Bates, Los Altos; Gordon R. Knight, Cupertino, both of Calif.

[73] Assignee: Xerox Corporation, Stamford, Conn.

[21] Appl. No.: 39,222

[22] Filed: May 14, 1979

[51] Int. Cl.³ .......................... G11C 13/04; G11B 7/14
[52] U.S. Cl. ................................. 365/234; 358/128.6; 360/97
[58] Field of Search ............... 365/120, 127, 215, 234; 358/128, 128.6; 360/33, 97

[56] References Cited

U.S. PATENT DOCUMENTS

| | | | |
|---|---|---|---|
| 3,363,054 | 1/1968 | Mason | 358/128 |
| 3,438,050 | 4/1969 | Aschenbrenner et al. | 365/234 |
| 3,573,471 | 4/1971 | Kolb | 365/127 |
| 3,701,846 | 10/1972 | Zenzefilis | 360/33 |
| 3,705,262 | 12/1972 | Kennedy et al. | 360/33 |
| 4,094,010 | 6/1978 | Pepperl et al. | 365/215 |
| 4,094,013 | 6/1978 | Hill et al. | 365/215 |
| 4,121,249 | 10/1978 | Lemelson | 365/120 |

FOREIGN PATENT DOCUMENTS

| | | |
|---|---|---|
| 1183948 | 12/1964 | Fed. Rep. of Germany . |
| 2543276 | 3/1977 | Fed. Rep. of Germany . |
| 2149654 | 3/1973 | France . |
| 2217761 | 9/1974 | France . |
| 2385170 | 10/1978 | France . |
| 2016744 | 9/1979 | United Kingdom . |
| 2016747 | 9/1979 | United Kingdom . |

OTHER PUBLICATIONS

*Elektronik*, "10¹⁰ bit auf einer Platte optisch gespeichert," vol. 27, No. 15, Dec. 1978, pp. 31–34.

Kenney et al., *IEEE Spectrum*, "An optical disk replaces 25 mag tapes", Feb. 1979, vol. 16, No. 2, pp. 33–38.

"High Efficiency Multiple Beam Gratings," by Lee, Optical Data Symposium, Society of Photographic Scientists and Engineers, 1/23–26/79, *Applied Optics*.

*Primary Examiner*—Stuart N. Hecker

[57] ABSTRACT

Periodic clock pulses are pre-recorded on each servo track of an optical disk to provide a local self-synchronizing source of clock frequency information for read only or direct read after write optical digital disk memories. In keeping with accepted practices, the servo track or tracks additionally function as references for controlling the radial positioning of a read head or a read/write head of such a memory.

7 Claims, 13 Drawing Figures

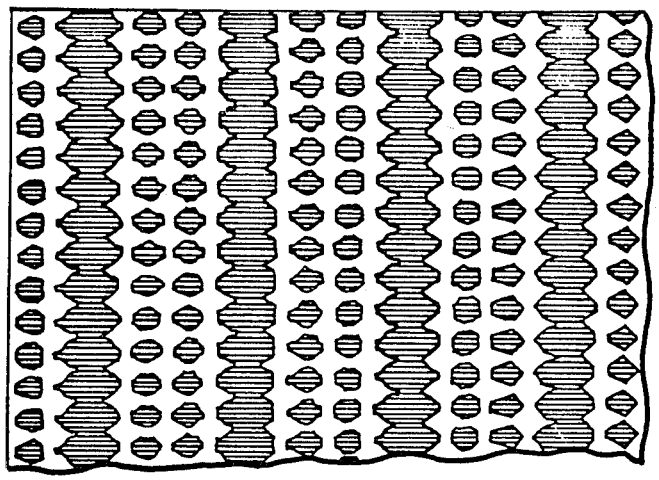
FIG. 4
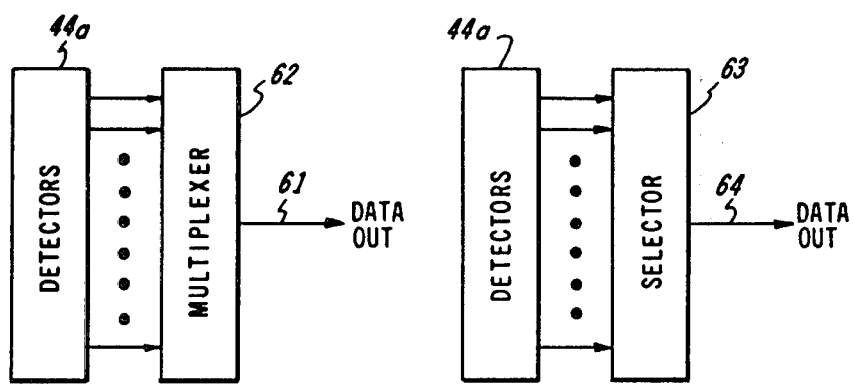
FIG. 9A
FIG. 9B

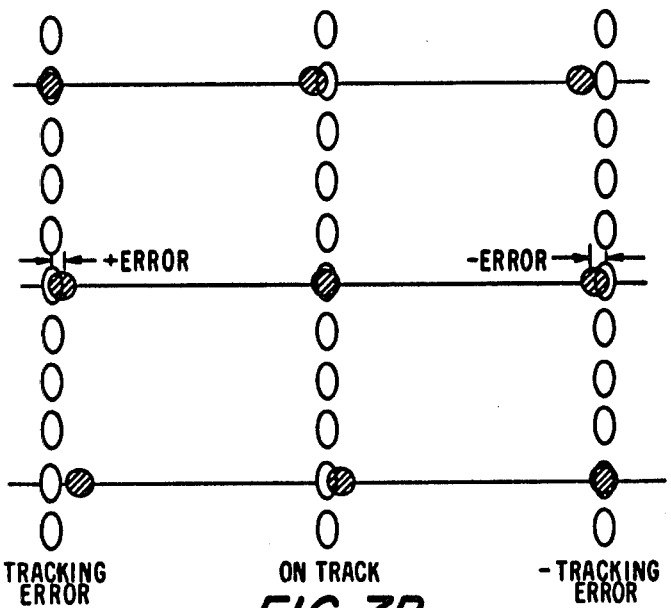
+TRACKING ERROR
FIG. 7A
ON TRACK
FIG. 7B
−TRACKING ERROR
FIG. 7C
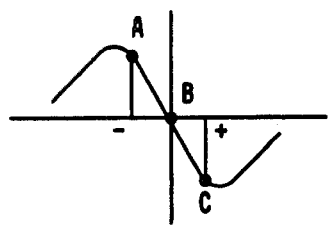
FIG. 6B
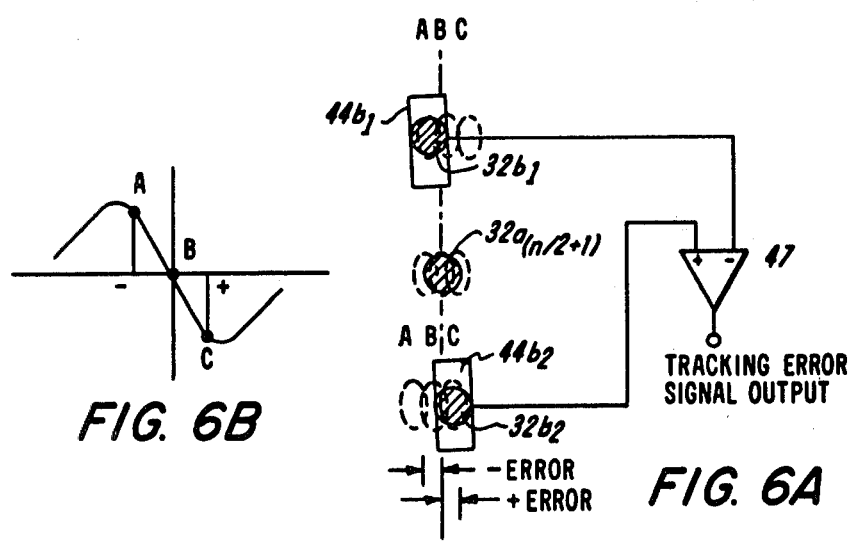
TRACKING ERROR SIGNAL OUTPUT
FIG. 6A

SELF-SYNCHRONIZING CLOCK SOURCE FOR OPTICAL MEMORIES

BACKGROUND OF THE INVENTION

This invention relates to optical memories for digital data and, more particularly, to a radial tracking and clock control for digital optical disk memories.

As is known, digital disk memories conventionally require a local source of clock frequency information and a radial tracking servo control system. In read only memories, the servo control system is used to precisely control the radial positioning of a focused read light beam so that the read beam is intensity modulated in accordance with the prerecorded serial data on a preselected data track or track sector. A video detector then converts the intensity modulated beam into an electrical video signal. If the recorded data is self clocking, the original digital bit stream is directly available from the video signal, typically as the modulation component of a carrier frequency signal. Otherwise, however, a synchronized clock source is required to supply clock pulses for synchronously sampling the video signal (or, more specifically, the demodulated video signal) at the appropriate rate to recover the original digital bit stream. Direct read after write digital optical disk memories have additional requirements because of the write function. In particular, a clock pulse source is required in conjunction with the input data so that such data is converted while being read out into a digital bit stream having a predetermined bit rate, and the radial tracking servo control system is needed for precisely controlling the radial positioning of an intensity modulated focused write light beam so that the digital data is serially recorded on a preselected data track or sector.

Heretofore, the need for clock frequency information and for radial tracking servo control have generally been treated as separate, unrelated requirements. For example, in U.S. Pat. No. 4,094,010 it is suggested that a groove be "burned" into the disk for radial tracking purposes and that an external clock be used to supply the clock pulses needed for writing and reading. Another relevant reference is Kenney et al., "An Optical Disk Replaces 25 Mag Tapes", *IEEE Spectrum*, February 1979, p. 33, where it is suggested (at p. 37) that digital data be recorded in self clocking form, thereby avoiding the need for synchronizing an external clock while data is being read from the disk.

As will be appreciated, the requirement that the external clock be synchronized for a read mode operation is one of the basic disadvantages of the digital optical disk memory described in the above-identified patent. Likewise, the memory described in the above-identified article suffers from the data density limitations which are inherent in recording digital data in self clocking form.

SUMMARY OF THE INVENTION

In accordance with the present invention, the disk for a digital optical disk memory is initialized by recording clock pulses on one or more servo tracks, thereby providing a source of clock frequency information directly on the disk. The disk may have a continuous spirally configured servo track or a plurality of concentric servo tracks. In either case, the servo pitch is selected so that there is space for a predetermined number of parallel data tracks on both sides of each servo track or servo track convolution. The clock pulses may be recorded on the servo track or tracks by an embossing process performed while the disk is being manufactured or by a laser writing process carried out at some later time but before any data is recorded.

The radial tracking servo control system typically relies on the distinctive parity or encoding of the clock pulses recorded on the servo track or tracks of an initialized disk to discriminate the servo tracks from the data tracks. Once the radial servo control system has locked onto a servo track, radial departures from the servo track are detected to provide the servo control system with a departure correcting error signal, and the clock pulses are read out to provide clock control for data recording or reading. As a result, data to be recorded may be encoded using non-self clocking codes, thereby providing a relatively high recorded data density.

BRIEF DESCRIPTION OF THE DRAWINGS

Still further objects and advantages of this invention will become apparent when the following detailed description is read in conjunction with the attached drawings, in which:

FIG. 4 illustrates a suitable profile for the diffraction grating of the disk memory shown in FIG. 1.

FIG. 6A illustrates a comparator circuit for generating a radial tracking error signal in response to video signals supplied by the detector array of FIG. 5;

FIG. 6B illustrates the error signal supplied by the comparator of FIG. 6A as a function of the radial tracking error;

FIGS. 7A, 7B and 7C illustrates the positioning of the clock pulse read beam and of the radial tracking beams relative to the clock pulses on a servo/clock track when the beams are offset by a positive tracking error, on-track, and offset by a negative tracking error, respectively;

FIG. 9A is a block diagram of a multiplexer for multiplexing a plurality of parallel data channels onto a serial output line; and FIG. 9B is a block diagram of a channel selector for coupling a selected one of a plurality of parallel data channels to a serial output line.

DETAILED DESCRIPTION OF THE ILLUSTRATED EMBODIMENT

While the invention is described in some detail hereinbelow with specific reference to a single illustrated embodiment, it is to be understood that there is no desire to limit it to that embodiment. On the contrary, the intent is to cover all modifications, alternatives and equivalents falling within the spirit and scope of the invention as defined by the appended claims.

Figure 1:
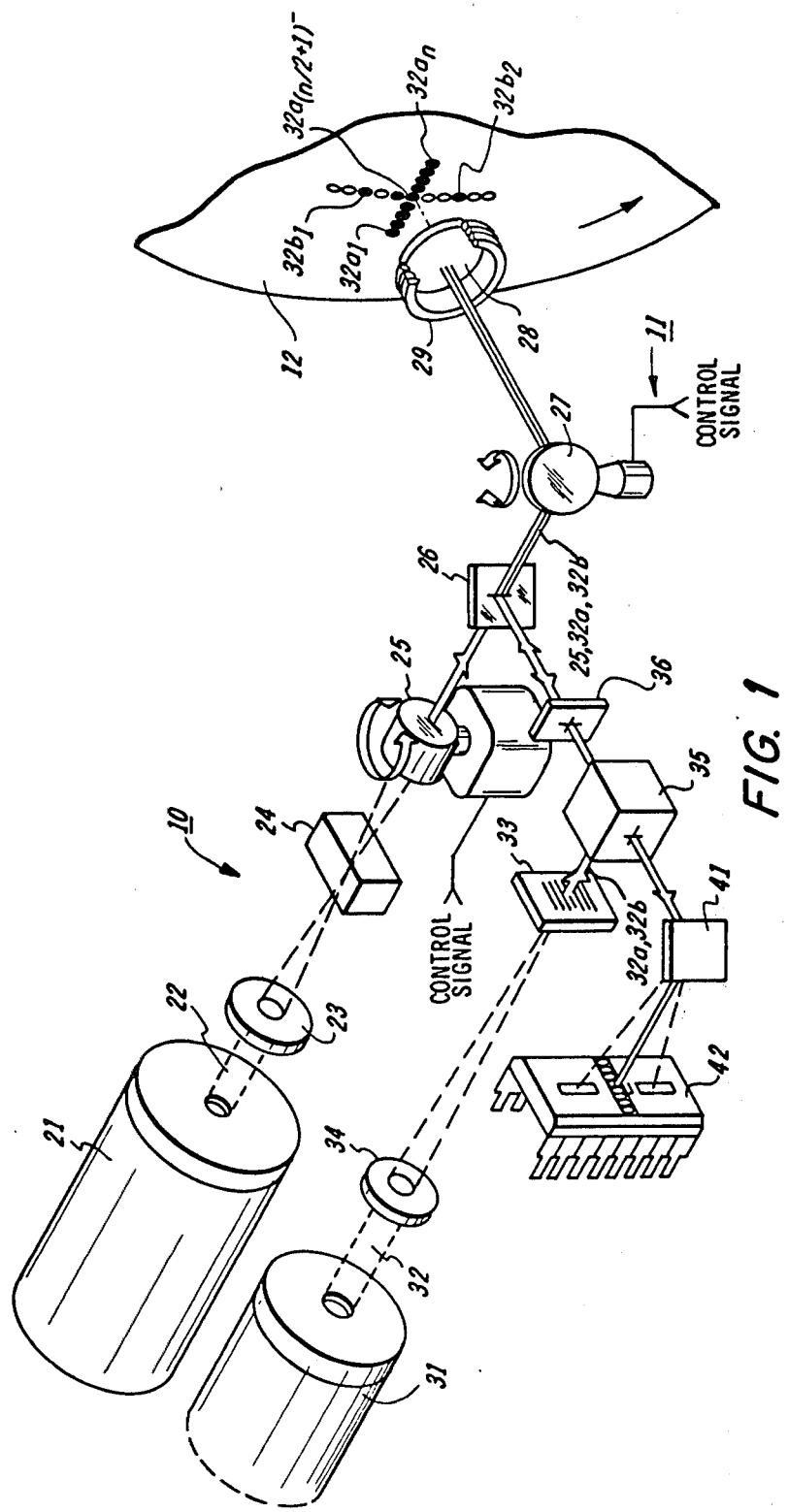
FIG. 1 is a schematic diagram of a direct read after write digital optical disk memory embodying the present invention.

Turning now to the drawings, and at this point especially to FIG. 1, there is a direct read after write optical recorder or disk memory 10 having a read/write head 11 for optically recording digital data on and retrieving digital data from a threshold sensitive recording medium 12. Typically, the recording medium 12 is a removable disk which is rotated (by means not shown) during operation at an essentially constant angular velocity in the direction of the arrow relative to the read/write head 11.

Figure 2:
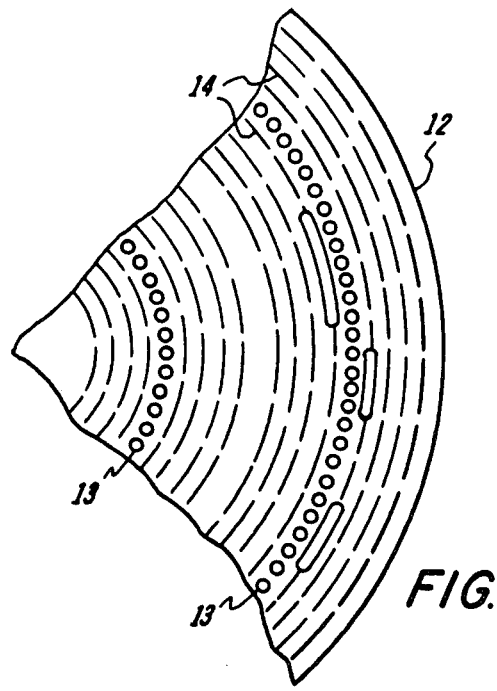
FIG. 2 is a fragmentary plan view of an optical disk which has been initialized to have one or more servo/clock tracks which are straddled by data tracks in accordance with this invention.
Figure 3:
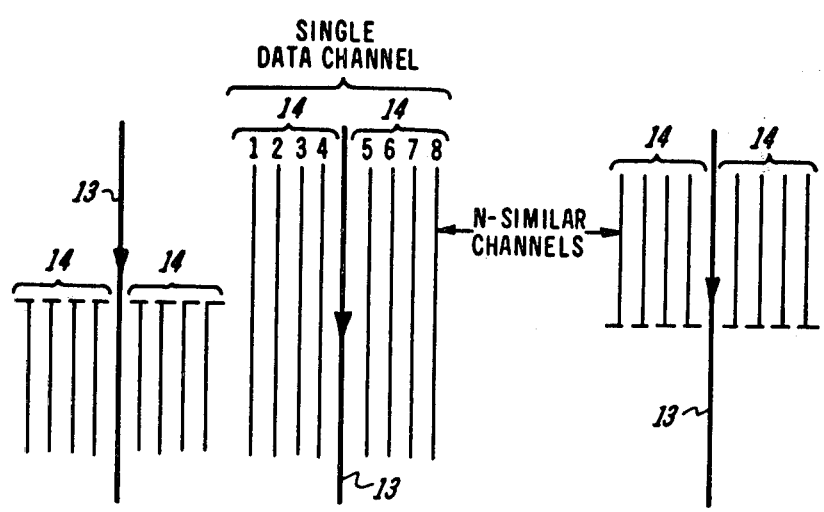
FIG. 3 is a more detailed diagram of a typical format for the servo/clock and data tracks of the disk shown in FIG. 2.

Referring for a moment to FIGS. 2 and 3, each recording disk 12 initialized to have one or more servo tracks 13 for controlling the radial positioning of the read/write head 11 during writing and reading. If the objective is to provide random access to relatively short digital data streams, there typically are a plurality of concentric servo tracks 13. On the other hand, if longer digital data streams are to be accommodated, a single servo track 13 having a continuous spiral configuration may be better. In any event, the servo track pitch is selected so that each servo track 13 is straddled by a predetermined number of data tracks 14. For example, as illustrated in FIG. 3, the disk 12 is initialized to have a plurality of concentric servo tracks 13 with a pitch of approximately 20 $\mu$m. That provides space to either side of each servo track 13 for four (4) concentric data tracks 14 having a pitch of 2 $\mu$m or so, while still leaving a guard band of about 4 $\mu$m between each adjacent set of data tracks 14 (i.e., adjacent data channels) as a tolerance allowance for errors in positioning the servo tracks 13 and the data tracks 14. Of course, if tight tolerances can be maintained over the positioning of the servo tracks 13 during the initialization of the disk 12, the guard bands may be reduced or even eliminated in the interest of providing further space on the disk 12 for additional data tracks 14. As will be evident, the above-described format may also be used for a disk having a single spirally configured servo track, except that such a disk is limited to a single band composed of a continuous, spirally configured servo track and one or more similarly configured data tracks.

Returning to FIG. 1, to record digital data on any given data track 14 of the disk 12, the read/write head 11 comprises a relatively high power laser 21 which is selectively energized for recording to supply a coherent write light beam 22. A relay lens 23 focuses the write beam 22 into an acousto-optic modulator 24, and an acoustic wave which is modulated in accordance with the digital data to be recorded is launched into the modulator 24 to intensity modulate the write beam 22. The intensity modulated write beam 22 is first transmitted through a refractive galvanometer 25 and then through a dichroic beam splitter 26 where it is combined with read beams 32a and 32b. The combined beams 22, 32a and 32b are subsequently reflected by a reflective galvanometer 27 to an objective lens 28. In keeping with accepted practices, the objective lens 28 is moved back and forth relative to the disk 12 by a servo controlled voice coil 29 so that the beams 22, 32a and 32b are focused on the disk 12.

As described in more detail hereinbelow, the reflective galvanometer 27 references the read/write head 11 to the servo track 13 of a preselected band of tracks. Thus, a control signal is applied to the refractive galvanometer 25, thereby causing it to rotate in a clockwise or counterclockwise direction, as indicated by the arrow, to independently align the write beam 22 with any given one of the data tracks 14 of the selected band. Accordingly, the intensity modulated write beam 22 serially alters the optical properties of the disk 12 lengthwise of the given data track 14 in accordance with the digital data which is to be recorded.

To retrieve previously recorded data from the disk 12 and to provide radial tracking and focus control while data is being recorded or retrieved, the read/write head 11 also includes a relatively low power laser 31 for supplying a coherent light beam 32 which is focused onto a two dimensional holographic diffraction grating 33 by a relay lens 34. The grating 33 diffracts the beam 32 to provide a plurality of essentially equal intensity, spaced apart read beams $32a_1 \ldots 32a_n$ (collectively referred to herein by the general designator 32a) and a pair of essentially equal intensity radial tracking and focus control beams $32b_1$ and $32b_2$ (collectively referred to by the general designator 32b). Typically, the grating 33 is produced using the pulse width modulation technique for fabricating a two dimensional holographic grating as described in Lee, "High Efficiency Multiple Beam Gratings", presented at the Optical Data Symposium, Society of Photographic Scientists and Engineers, Jan. 23–26, 1979 (Applied Optics), which is hereby incorporated by reference. As will be seen, the diffracted beams 32a and 32b are refracted by a polarizing beam splitter 35 to a quarter ($\frac{1}{4}$) wavelength plate 36 which, in turn, transmits them to the dichroic beam splitter 26. The lasers 21 and 31 are selected to have significantly different output wavelengths. Hence, the beam splitter 26 reflects the diffracted beams 32a and 32b for application to the disk 12 via the galvanometer 27 and the objective lens 28 as previously described.

More particularly, as shown, the read beams $32a_1 \ldots 32a_n$ optically read out the servo track 13 and all of the data tracks 14 of any selected band of tracks in parallel. In other words, one of the read beams-namely, the center one $32a_{(n/2+1)}$-illuminates the servo track 13 of the selected band-while the others illuminate different ones of the associated data tracks 14. To that end, the read beams $32a_1 \ldots 32a_n$ are equidistantly spaced in, say, horizontal alignment at the output of the grating 33 so that the objective lens 28 focuses them onto the disk 12 in essentially radial alignment and on centers which are more or less equidistantly spaced by an amount selected to match the data track pitch. The radial tracking and focus control beams $32b_1$ and $32b_2$, on the other hand, are spaced above and below, respectively, the servo track or center read beam $32a_{(n/2+1)}$ at the output of the grating 33, but are tilted at a small angle (1°–3°) relative to the normal or vertical axis. Specifically, the spacing of and the tilt angle for the radial tracking and focus control beams $32b_1$ and $32b_2$ are selected so that the objective lens 28 focuses those beams onto the disk 12 above and below, respectively, the read beams $32a_1 \ldots 32a_n$ on opposite sides of but substantially tangential to a line which passes through the servo track read beam $32a_{(n/2+1)}$ tangentially relative to the disk 12. Thus, it is important that the radius of curvature of the servo tracks 13 is negligible over the arc subtended by the radial tracking and focus control beams $32b_1$ and $32b_2$, but otherwise the spacing between those beams can be selected to provide maximum sensitivity to radial tracking and focus errors. In the interest of completeness, a two dimensional diffraction grating 33 which may be used to provide diffracted read beams 32a and radial tracking and focus control beams 32b of the foregoing type for a disk 12 having eight (8) data tracks 14 per band is shown in FIG. 4. The illustrated grating was fabricated using the pulse width modulation technique described in Wai-Hon Lee's aforementioned paper.

As will be recalled, the recording disk 12 is a threshold sensitive recording medium. For example, the disk 12 suitably comprises an ablatable tellurium based, reflective film which is coated on an optically transparent substrate, such as glass or plastic. In that event, the output power of the laser 21 and the depth of modulation of the write beam 22 are selected so that the intensity of the write beam 22, as measured at the disk 12, swings above and below a predetermined ablation threshold level for the film as a function of the modulation. Consequently, as shown in FIG. 2, the write beam 22 opens small holes in the film to represent the data which is to be recorded. In contrast, the output power of the laser 31 is selected to ensure that the intensities of the read beams 32a and of the radial tracking and focus control beams 32b remain well below the ablation threshold of the film. Thus, the beams 32a and 32b do not affect the optical properties of the disk 12, but are reflected therefrom after being intensity modulated in accordance with any prerecorded information they happen to scan.

The reflected write beam 22, read beams 32a and radial tracking and focus control beams 32b pass back through the objective lens 28 and then serially reflect off the galvanometer 27 and next off the dichroic beam splitter 26. From there, the relected beams 22, 32a and 32b are sequentially transmitted through the quarter wavelength plate 36 and then through the polarizing beam splitter 35 to a mirror 41 which, in turn, reflects the beams 22, 32a and 32b to individual detectors of a detector array 42. The quarter wavelength plate 36 and the polarizing beam splitter 35 are relied on to prevent any significant optical feedback to the laser 31 so that the reflected beams 22, 32a and 32b are efficiently transmitted to the detector array 42.

Figure 5:
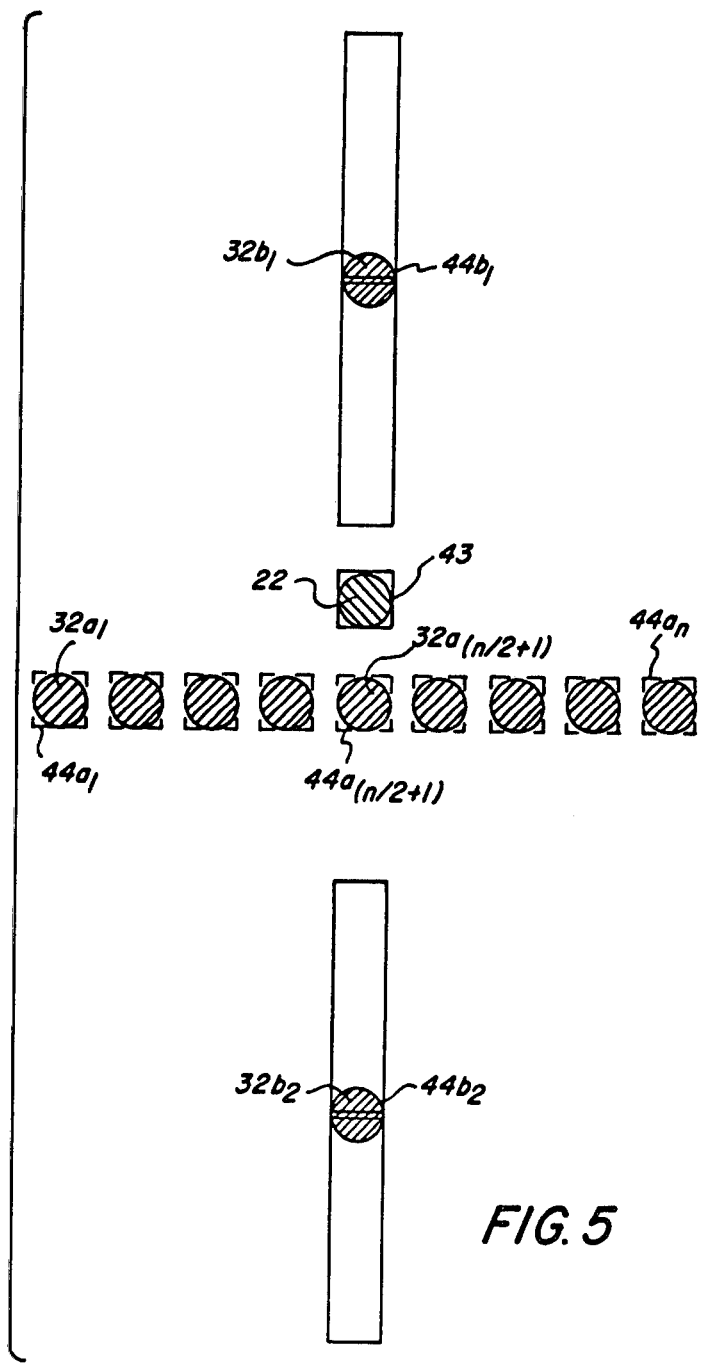
FIG. 5 is an enlarged layout diagram of the detector array shown in FIG. 1.

Referring to FIG. 5, it will be seen that the detector array 42 has individual detector elements 43, $44a_1$ ... $44a_{nl}$ and $44b_1$ and $44b_2$ which are positioned to intercept the reflected write beam 22, read beams $32a_l$ ... $32a_{nl}$ and radial tracking and focus control beams $32b_1$ and $32b_2$, respectively, so that those beams are converted into corresponding video signals. As illustrated in FIG. 1, the read beams $32a_l$ ... $32a_n$ are effectively supplied by individual point sources (i.e., the diffracted output of the diffraction grating 33). It should, however, be understood that those beams could also be supplied by a common-line like source (not shown) since the segmentation of the detector elements $44a_l$ ... $44a_n$ inherently perform a beam separation function. Indeed, the basic disadvantage of using a commonline like source for supplying the read beams $32a_l$ ... $32a_n$ is expected to be increased crosstalk between those beams.

In accordance with this invention, as shown in FIG. 2, periodic clock pulses are written on each of the servo tracks 13 during the initialization of the disk 12. Thus, the tracks 13 function as servo/clock tracks. As will be appreciated, the clock pulses may be pre-embossed onto the servo tracks 13 during the manufacture of the disk 12. If that technique is used, the embossing depth should be controlled to be an odd integer multiple of one quarter of the output wavelength of the laser 31 so that the clock pulses cause intensity modulation of the servo track read beam $32a_{(n/2+1)}$. Alternatively, the clock pulses may be ablated onto the servo track 13 through the use of a laser writing station (not shown) having independent radial positioning control means.

Turning to FIGS. 6A and 6B, once the galvanometer 27 (FIG. 1) has locked onto a servo track 13, any further radial movement of the radial tracking and focus control beams $32b_1$ and $32b_2$ will result in an imbalance in the optical modulation of those beams. Thus, the optical detector elements $44b_1$ and $44b_2$ are coupled to the inverting and non-inverting inputs, respectively, of an operational amplifier 47 to provide a corrective error signal for the galvanometer 27. Positive or negative radial tracking errors, such as shown in FIGS. 7A and 7C, respectively, which are within approximately plus or minus one half of the data track pitch of being "on track" (FIG. 7B) may be corrected in this manner, but greater errors require a coarser adjustment.

Figure 8:
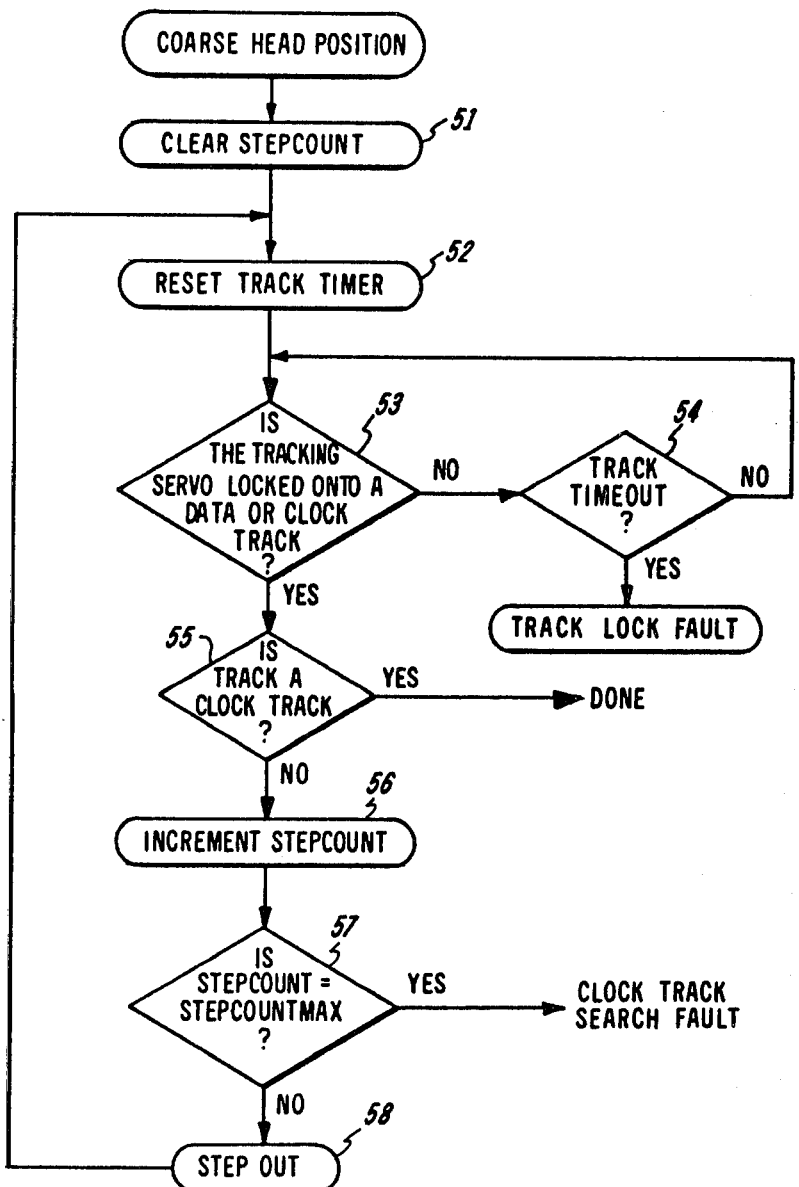
FIG. 8 is a flow diagram of a typical servo/clock track acquisition process.

Thus, as shown in FIG. 8, provision is made for seeking a servo/clock track 13 once the disk has been positioned (by means not shown) to bring such a track 13 within the field of view of the objective lens 28. This provision forms no part of the present invention and will, therefore, be discussed on a highly simplified level. Indeed, as illustrated, there is a simple routine, such as might be carried out under program control. At the outset of the routine, a step counter (not shown) is cleared, as indicated at 51, and a timer (also not shown) is reset, as indicated at 52. Thereafter, the servo track read beam detector $44a_{(n/2'1)}$ is monitored, as indicated at 53, to determine whether the servo track read beam $32a_{(n/2+1)}$ is tracking on either a servo/clock track 13 or a data track 14. The timer provides a predetermined time-out period, as indicated at 54, for the galvanometer 27 (FIG. 1) to stabilize the servo track read beam on one or another of the tracks in response to the corrective error signal supplied by the operational amplifier 47 (FIG. 6A). Once tracking is achieved, a parity check or the like is performed (by means not shown) on the output of the servo track read beam detector $44a_{(n/2+1)}$ to determine, as indicated at 55, whether the read beam $32a_{(n/2+1)}$ is tracking on a servo/clock track 13 or a data track 14. For example, the clock pulses may be recorded with an even parity and data with an odd parity so that a simple parity check may be relied on to discriminate between the servo/clock tracks 13 and the data tracks 14. If it is determined that the servo track read beam $32a_{(n/2+1)}$ is tracking on a servo/clock track 13, the routine is completed and the operational amplifier 47 acquires exclusive control over the subsequent positioning of the 27. If, on the other hand, it is found that the read beam $32a_{(n/2+1)}$ is tracking on a data track 14, the step counter is incremented by one, as indicated at 56, and the accumulated count is then compared, as indicated at 51, against a predetermined maximum permissible count equal to, say, the number of data tracks 14 per band. If the maximum permissible count is reached, a fault occurs. Otherwise, a step-like increment is added, as indicated at 58, to the control signal, for the galvanometer 27 to shift the servo track read beam $32a_{(n/2+1)}$ one track to the right or left. Thus, the routine recycles to reset the timer and to then repeat the above-described steps in search of a servo/clock track 13.

Referring to FIG. 9A, the video signals supplied by the detector elements $44a_l$ ... $44a_n$ (collectively referred to by the general designator 44a) in response to the reflected read beams $32a_l$ ... $32a_n$, respectively, may be applied to a serial output line 61 by a multiplexer 62. If it is desired to separate the clock frequency video from the detector $44a_{(n/2+1)}$ from the video data provided by the other read beam detectors, the multiplexer 62 may be used to multiplex the video from such other detectors onto the output line 61. Alternatively, as shown in FIG. 9B, the detector elements 44a may be coupled in parallel to a channel selector 63 to selectively read out the servo/clock track 13 or any one of the data tracks 14 of a selected data channel via a serial output line 64. Still other combinations of serial and parallel read outs will, of course, be evident.

CONCLUSION

In view of the foregoing, it will now be understood that this invention provides a local, self-synchronizing source of clock frequency information for use in recording digital data on and retrieving such data from optical memories, such as optical disks. Due to the self-synchronizing nature of the clock source, digital data may be easily recovered, even if it is encoded by a non-self clocking code for recording. Furthermore, it will be understood that this invention effectively combines the clock source with the radial tracking position control function by using the servo track or tracks to store the clock pulses.

What is claimed is:

1. A digital optical memory for use with a recording medium having at least one band of tracks, each such band including at least one data track for storing data and a servo track containing periodic clock pulses; said memory comprising optical means for simultaneaously focusing a first light beam on said data track and a second light beam on said servo track, whereby said first and second light beams are modulated in accordance with said data and said clock pulses, respectively;

servo control means coupled to said optical means for maintaining said second light beam on said servo track; and detector means positioned to intercept said first and second modulated light beams, thereby simultaneously providing a first signal representing said data and a second signal representing a local source of clock frequency information.

2. The optical memory of claim 1 wherein
   said memory is a digital optical disk memory,
   said recording medium is a disk having a plurality of concentric bands of tracks,
   each of said bands includes a concentric servo track deposed between a plurality of concentric data tracks,
   the servo track for each of said bands has periodic clock pulses prerecorded thereon,
   said servo control means references the radial position of said optical means to the servo track of a selected one of said bands, and
   said optical means focuses said second light beam on the servo track of the selected band and said first light beam on a selected one of the data tracks of the selected band, whereby said detector provides said memory with a local souce of clock frequency information for each of said bands.

3. The optical memory of claim 2 wherein
   said disk is removably mounted on said memory, and
   said clock pulses are embossed onto the servo track of each of said bands.

4. The optical memory of claim 3 wherein
   said memory is a direct read after write optical memory having means for supplying a relatively high power intensity modulated write beam for recording digital data and a relatively low power unmodulated read beam for retrieving said data, and
   said disk includes a threshold sensitive recording material having a threshold selected to record digital data in response to the intensity modulation of said write beam and to allow non-destructive read out of said recorded data by said read beam.

5. The optical memory of claim 4 wherein said recording material is an ablatable reflective film coated on an optically transparent substrate.

6. The optical memory of claim 2 wherein
   said disk is removably mounted on said memory and comprises an ablatable reflective film coated on an optically transparent substrate, and
   said clock pulses are ablated onto the servo track of each of said bands.

7. The optical memory of claim 6 wherein
   said memory is a direct read after write optical memory having means for supplying a relatively high power intensity modulated light beam for recording digital data and a relatively low power unmodulated read beam for retrieving said data, and
   said film has an ablation threshold level selected to allow ablation to occur in response to said write beam, without risk of any significant ablation being caused by said read beam.

* * * * *